(12) United States Patent
Cheng et al.

(10) Patent No.: US 11,720,275 B2
(45) Date of Patent: Aug. 8, 2023

(54) FILE READING METHOD, NON-TRANSITORY COMPUTER READABLE STORAGE MEDIUM, AND COMMUNICATION DEVICE FOR READING FILE FROM NON-VOLATILE MEMORY

(71) Applicant: Realtek Semiconductor Corporation, Hsinchu (TW)

(72) Inventors: Chin Cheng, Hsinchu (TW); Yi-Xin Huang, Suzhou (CN); Xiao-Lu Ma, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 133 days.

(21) Appl. No.: 17/212,172

(22) Filed: Mar. 25, 2021

(65) Prior Publication Data
US 2022/0155963 A1 May 19, 2022

(30) Foreign Application Priority Data
Nov. 19, 2020 (CN) .......................... 202011299901.7

(51) Int. Cl.
*G06F 3/06* (2006.01)
(52) U.S. Cl.
CPC .............. *G06F 3/065* (2013.01); *G06F 3/061* (2013.01); *G06F 3/0659* (2013.01); *G06F 3/0673* (2013.01); *G06F 3/0679* (2013.01)

(58) Field of Classification Search
CPC ...... G06F 3/065; G06F 3/0604; G06F 3/0659; G06F 3/0679; G06F 3/061; H04W 8/183
See application file for complete search history.

(56) References Cited

U.S. PATENT DOCUMENTS

| 2014/0057679 A1* | 2/2014 | Berionne | H04W 8/183 |
| | | | 455/558 |
| 2016/0127176 A1* | 5/2016 | Edara | H04B 1/3816 |
| | | | 455/558 |

FOREIGN PATENT DOCUMENTS

| CN | 101304573 A | 11/2008 |
| CN | 101911740 A | 12/2010 |
| CN | 102065180 A | 5/2011 |
| CN | 102387498 A | 3/2012 |

* cited by examiner

*Primary Examiner* — Tasnima Matin
(74) *Attorney, Agent, or Firm* — Locke Lord LLP; Tim Tingkang Xia, Esq.

(57) ABSTRACT

A file reading method includes following operations: determining, by a processor, whether a file in a SIM card is stored in a non-volatile memory; performing, by the processor, a reading process to read the file from the SIM card if the file is not stored in the non-volatile memory; and storing, by the processor, the file into the non-volatile memory.

18 Claims, 6 Drawing Sheets

FILE READING METHOD, NON-TRANSITORY COMPUTER READABLE STORAGE MEDIUM, AND COMMUNICATION DEVICE FOR READING FILE FROM NON-VOLATILE MEMORY

RELATED APPLICATIONS

This application claims priority to Chinese Application Serial Number 202011299901.7, filed Nov. 19, 2020, which is herein incorporated by reference.

BACKGROUND

Technical Field

The present disclosure relates to file reading systems. More particularly, the present disclosure relates to a file reading method, a non-transitory computer readable storage medium, and a communication device.

Description of Related Art

With developments of technology, communication devices can communicate with each other via several communication approaches. In general, a processor of a communication device needs to reads files stored in a Subscriber Identity Module (SIM) card of the communication device in order to initialize the communication device. Then, the initialized communication device can establish data transmission. In addition, the processor can be operated to read or update the files stored in the SIM card.

SUMMARY

Some aspects of the present disclosure are to provide a file reading method. The file reading method includes following operations: determining, by a processor, whether a file in a Subscriber Identity Module (SIM) card is stored in a non-volatile memory; performing a reading process, by the processor, to read the file from the SIM card if the file is not stored in the non-volatile memory; and storing, by the processor, the file into the non-volatile memory.

Some aspects of the present disclosure are to provide a non-transitory computer readable storage medium. The non-transitory computer readable storage medium includes at least one program code. A processor is configured to execute the at least one program code to perform following operations: determining whether a file in a SIM card is stored in a non-volatile memory; performing a reading process to read the file from the SIM card if the file is not stored in the non-volatile memory; and storing the file into the non-volatile memory.

Some aspects of the present disclosure are to provide a communication device. The communication device includes a non-volatile memory, a SIM card, and a processor. The SIM card is configured to store a file. The processor is coupled to the non-volatile memory and the SIM card. The processor is configured to determine whether the file is stored in the non-volatile memory. The processor performs a reading process to read the file from the SIM card if the file is not stored in the non-volatile memory, and stores the file into the non-volatile memory.

Based on the descriptions above, in the present disclosure, if the file is not stored in the non-volatile memory, the processor performs the reading process to read the file from the SIM card and store the file into the non-volatile memory. Thus, the processor is able to read the file directly from the non-volatile memory next time so the efficiency of the communication device is improved.

BRIEF DESCRIPTION OF THE DRAWINGS

The disclosure can be more fully understood by reading the following detailed description of the embodiment, with reference made to the accompanying drawings as follows.

DETAILED DESCRIPTION

The following embodiments are disclosed with accompanying diagrams for detailed description. For better understanding, many details of practice are explained in the following descriptions. However, it is understood that these details of practice do not intend to limit the present disclosure. That is, these details of practice are not necessary in part of embodiments of the present embodiments.

In the present disclosure, "connected" or "coupled" may refer to "electrically connected" or "electrically coupled." "Connected" or "coupled" may also refer to operations or actions between two or more elements.

Figure 1:
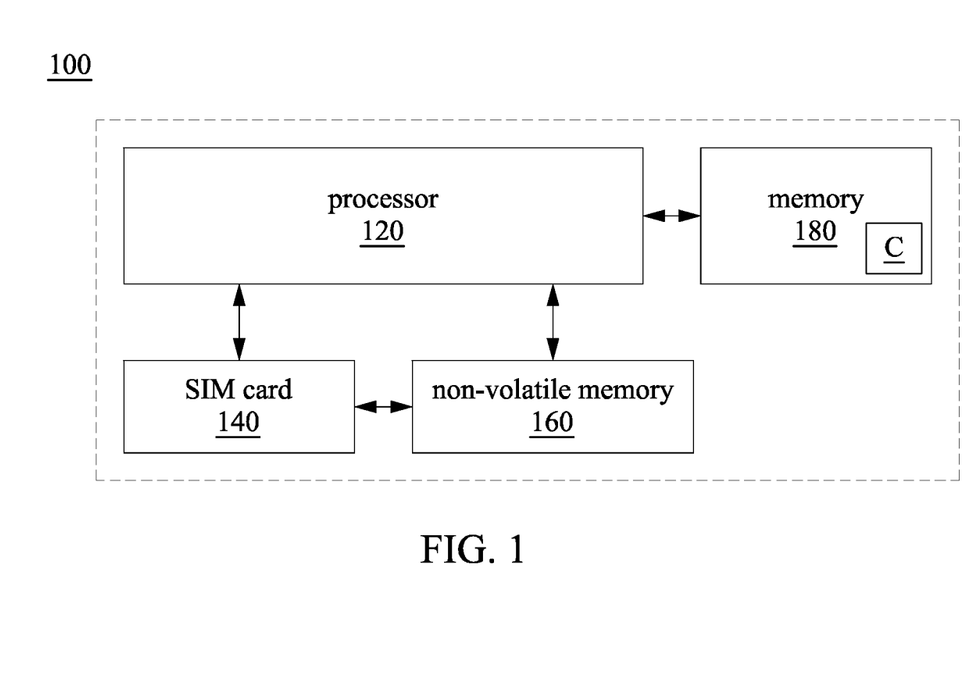
FIG. 1 is a schematic diagram illustrating a communication device according to some embodiments of the present disclosure.

Reference is made to FIG. 1. FIG. 1 is a schematic diagram illustrating a communication device 100 according to some embodiments of the present disclosure. In some embodiments, the communication device 100 may be, for example, a cell phone, but the present disclosure is not limited thereto.

As illustrated in FIG. 1, the communication device 100 includes a processor 120, a Subscriber Identity Module (SIM) card 140, a non-volatile memory 160, and a memory 180. The processor 120 is coupled to the SIM card 140, the non-volatile memory 160, and the memory 180. The SIM card 140 is coupled to the non-volatile memory 160.

In some embodiments, the processor 120 is a central processing unit (CPU), an application-specific integrated circuit (ASIC), multi-processors, or a distributed processing system, but the present disclosure is not limited thereto. Various suitable circuits or elements are within the contemplated scopes of the present disclosure.

In some embodiments, the SIM card 140 is a Universal Subscriber Identity Module (USIM) card.

In some embodiments, the non-volatile memory 160 is a non-volatile random access memory (NVRAM), but the present disclosure is not limited thereto. Various suitable non-volatile memories are within the contemplated scopes of the present disclosure.

In some embodiments, the memory 180 includes a non-transitory computer readable storage medium and the non-transitory computer readable storage medium stores one or more pieces of program codes C. In operation, the processor 120 can execute the one or more pieces of program codes C to perform corresponding operations.

Figure 2:
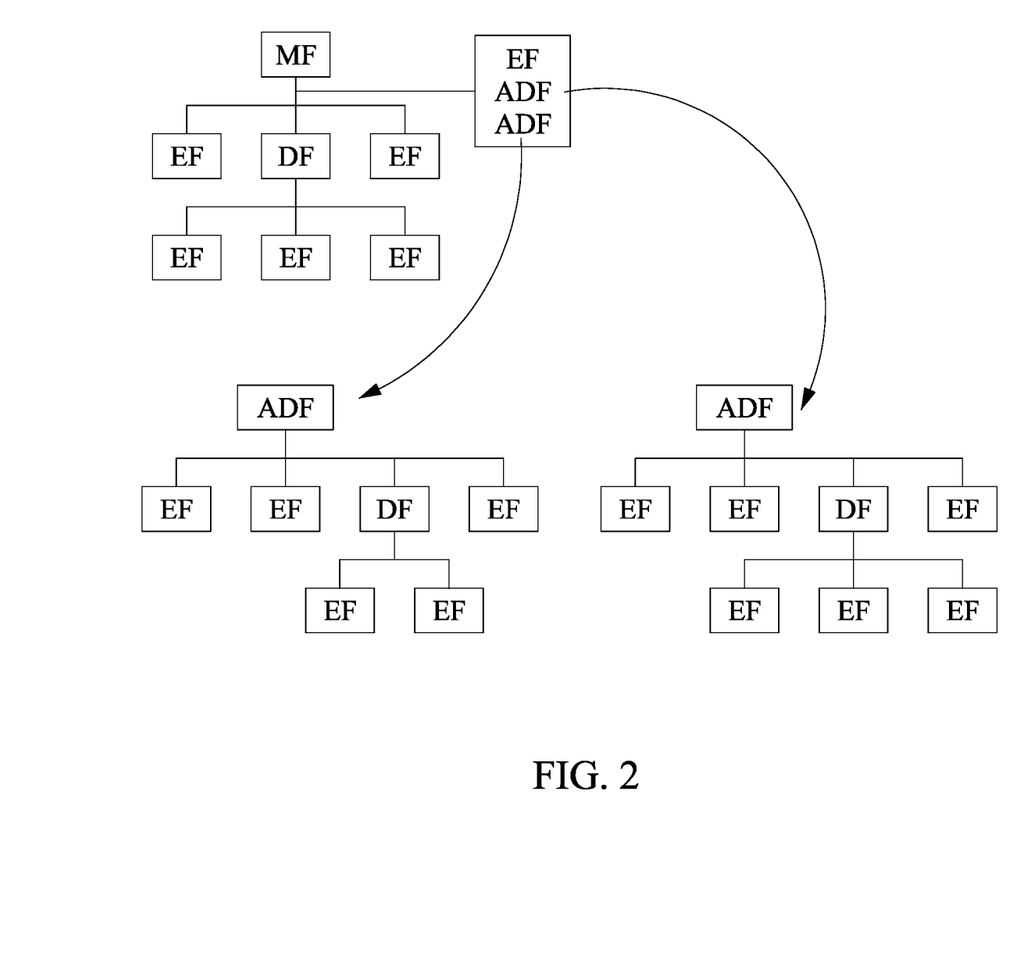
FIG. 2 is a schematic diagram illustrating a file structure of a SIM card according to some embodiments of the present disclosure.

Reference is made to FIG. 2. FIG. 2 is a schematic diagram illustrating a file structure of the SIM card 140 according to some embodiments of the present disclosure. As illustrated in FIG. 2, the file structure of the SIM card 140 includes a master file MF, multiple dedicated files DF, and multiple elementary files EF. In addition, the file structure further includes application dedicated files ADF, and the application dedicated files ADF are special dedicated files.

It is noted that the "reading process" mentioned in following paragraphs refers to the process of reading the elementary files EF in FIG. 2. Each of the elementary files EF has corresponding file control parameters. The file control parameters are, for example, a file identification number (file ID), a short file identification number (SFI), a file size, a file structure, an access condition, etc.

The access condition, for example, includes a read access condition, an update access condition, an activate access condition, and a deactivate access condition. An access condition level includes an always (ALW) level, a user identification number (PIN/PIN2) level, an administrator (ADM) level, and a never (NEV) level. In other words, when the access condition level of an elementary file EF is the ALW level or the PIN/PIN2 level, it allows users to perform related operations on the elementary file EF. When the access condition level of an elementary file EF is the ADM level or the NEV level, it forbids the users to perform related operations on the elementary file EF.

Figure 3:
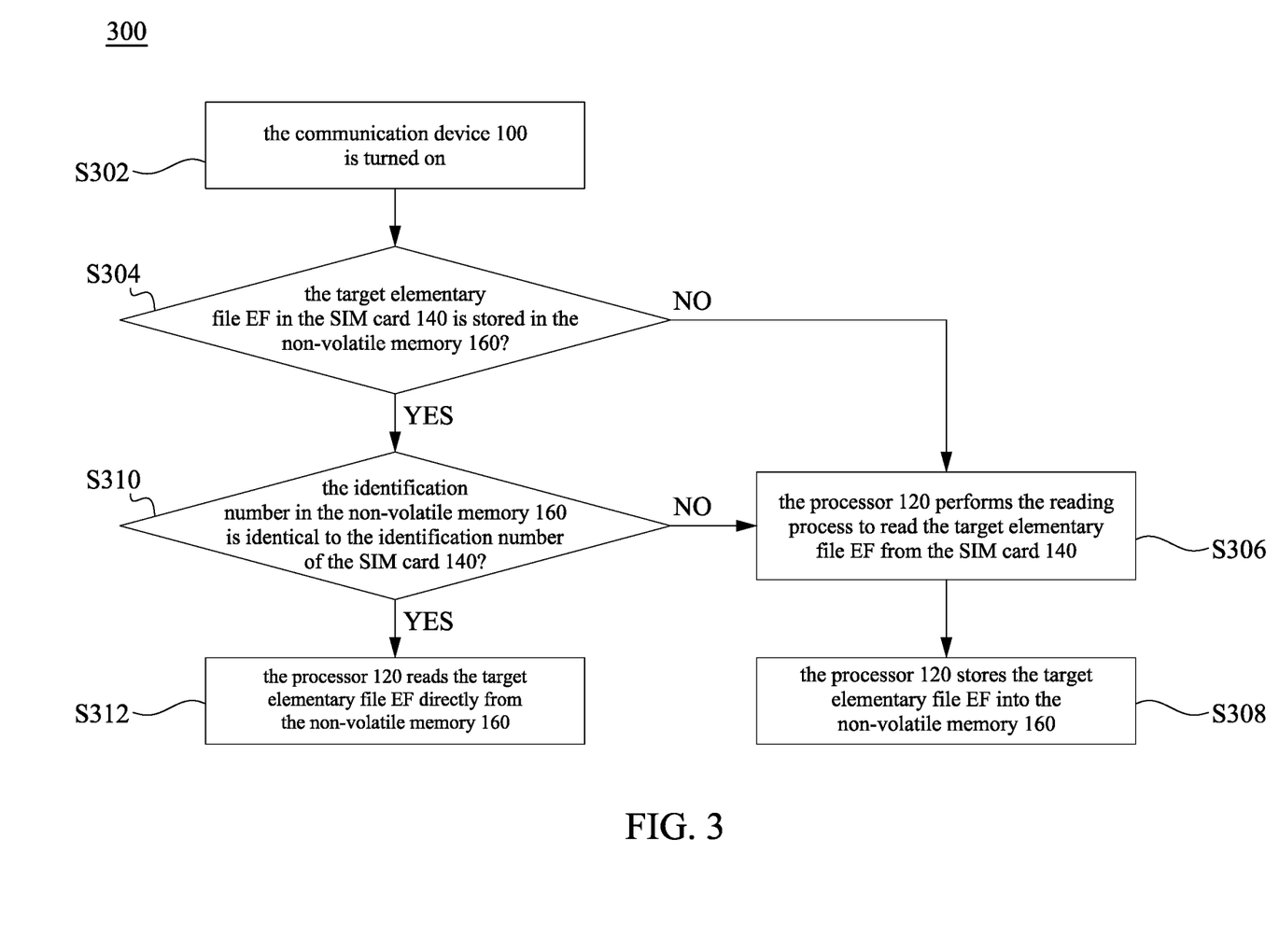
FIG. 3 is a flow diagram illustrating a file reading method according to some embodiments of the present disclosure.

References are made to FIG. 1, FIG. 2, and FIG. 3. FIG. 3 is a flow diagram illustrating a file reading method 300 according to some embodiments of the present disclosure. As described above, the processor 120 in FIG. 1 can perform the program codes C in the memory 180 to execute the file reading method 300 in FIG. 3, in order to read a target elementary file (for example, one of the elementary files EF) in FIG. 2.

As illustrated in FIG. 3, the file reading method 300 includes operations S302, S304, S306, S308, S310, and S312.

In operation S302, the communication device 100 is turned on (or say powered on). For example, the communication device 100 is powered on through a boot process.

In operation S304, the processor 120 determines whether the target elementary file EF in the SIM card 140 is stored in the non-volatile memory 160. For example, if the communication device 100 is just turned on, the target elementary file EF is not stored in the non-volatile memory 160 (the determination result of operation S304 shows "NO"). In this situation, an operation S306 is entered.

In operation S306, the processor 120 performs the reading process to read the target elementary file EF from the SIM card 140. The details about the "reading process" are described in following paragraphs with reference to FIG. 4.

In operation S308, the processor 120 stores the target elementary file EF into the non-volatile memory 160. Thus, the processor 120 can read the target elementary file EF directly from the non-volatile memory 160 next time. In some embodiments, except for the target elementary file EF, the processor 120 also stores an identification number of the SIM card 140 into the non-volatile memory 160.

In some embodiments, if users have the permission to update (or modify) the file and the target elementary file EF in the SIM card 140 and the target elementary file EF is actually being updated (or modified), the processor 120 can update the target elementary file EF stored in the non-volatile memory 160 correspondingly. For example, the processor 120 can perform operations S306 and S308 to store the updated (or modified) target elementary file EF into the non-volatile memory 160, in order to ensure that the target elementary file EF in the non-volatile memory 160 is consistent with the target elementary file EF in the SIM card 140.

In the operation S304, if the target elementary file EF is stored in the non-volatile memory 160 (the determination result of operation S304 shows "YES"), an operation S310 is entered.

In operation S310, the processor 120 determines whether an identification number in the non-volatile memory 160 is identical to the identification number of the SIM card 140. If the identification number in the non-volatile memory 160 is identical to the identification number of the SIM card 140 (the determination result of operation S310 shows "YES"), it indicates that the current SIM card 140 is unchanged. In this situation, an operation S312 is entered.

In operation S312, the processor 120 reads the target elementary file EF directly from the non-volatile memory 160.

It returns back to operation S310. If the identification number in the non-volatile memory 160 is different from the identification number of the SIM card 140 (the determination result of operation S310 shows "NO"), it indicates that the current SIM card 140 might have been changed. Then, operations S306 and S308 are entered. In operations S306 and S308, the processor 120 performs the reading process on the new the SIM card 140 to read a new target elementary file EF in the new SIM card 140, and store the new target elementary file EF and the identification number of the new SIM card 140 into the non-volatile memory 160, in order to overwrite the previously stored target elementary file EF and the identification number of the old SIM card 140. Thus, next time the processor 120 can read the new target elementary file EF directly from the non-volatile memory 160.

In some related arts, a processor of a communication device needs to read file(s) stored in a SIM card of this communication device in order to initialize this communication device. In addition, the processor also needs to read or update the file(s) stored in the SIM card when the processor works. In other words, in these related arts, the processor needs to frequently read the file(s) stored in the SIM card. However, this could reduce the efficiency of the communication device.

Compared to the related arts mentioned above, in the present disclosure, the processor 120 merely reads the target elementary file EF from the SIM card 140 once and stores the target elementary file EF into the non-volatile memory 160. In this way, next time the processor 120 tries to read the target elementary file EF, the processor 120 can read the target elementary file EF directly from the non-volatile memory 160. Since the reading data from the non-volatile memory 160 is faster, the present disclosure can improve the efficiency of the communication device 100.

The above description of the file reading method 300 includes exemplary operations, but the order of executing the operations of the file reading method 300 are not limited. The file reading method 300 disclosed in the present disclosure allows operation insertions, operation interchanges, or operation omits in accordance with the spirit and scope of various embodiments of the present disclosure. The operations are able to be executed simultaneously or partially simultaneously as appropriate in accordance with the spirit and scope of various embodiments of the present disclosure.

Figure 4:
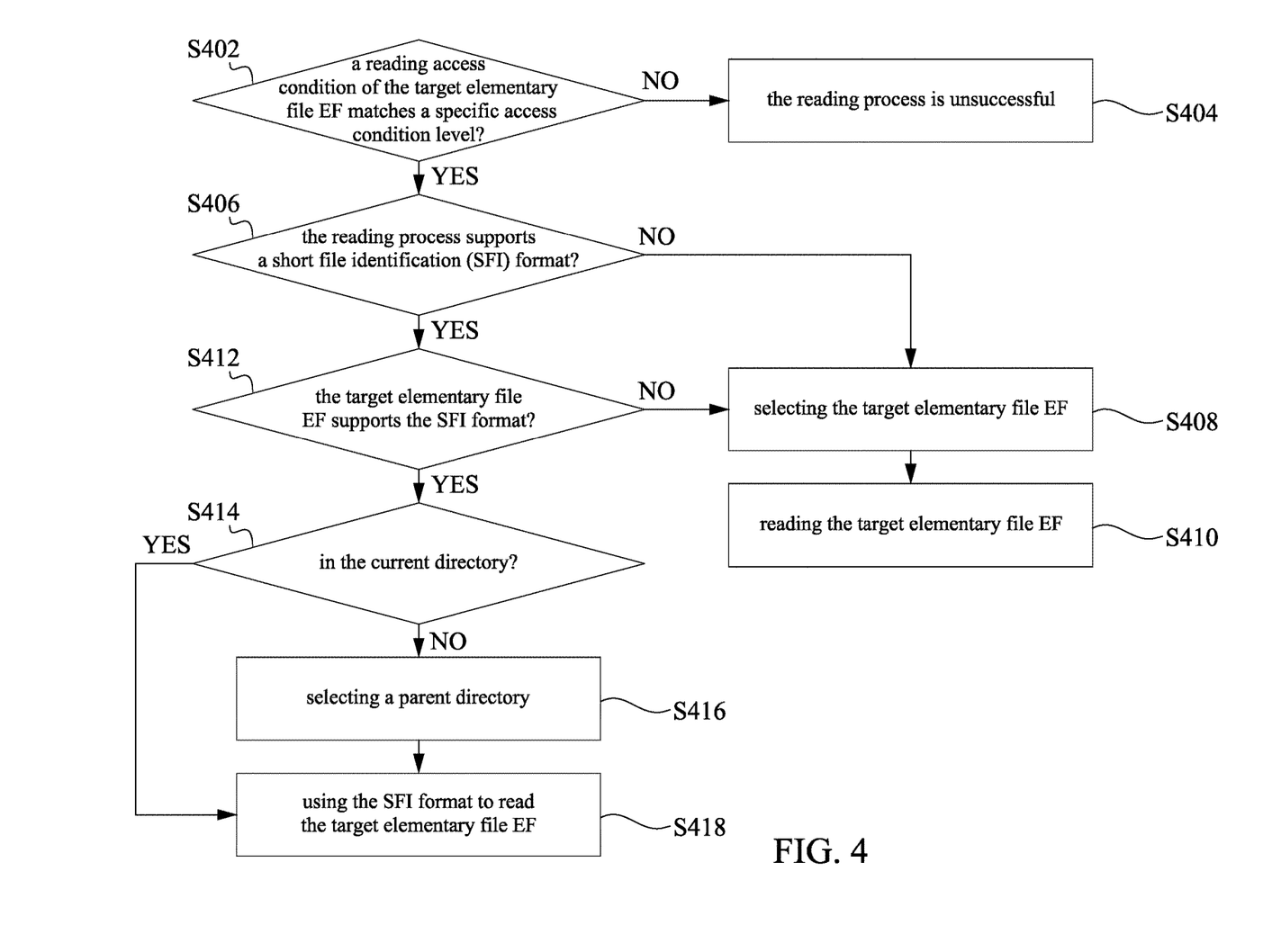
FIG. 4 is a flow diagram illustrating a reading process according to some embodiments of the present disclosure.

References are made to FIG. 1 and FIG. 4. FIG. 4 is a flow diagram illustrating a reading process according to some embodiments of the present disclosure. The details of operation S306 (i.e., the processor 120 performs the reading process to read the target elementary file EF from the SIM card 140) in FIG. 3 are described in following paragraphs with reference to FIG. 4.

In operation S402, the processor 120 determines whether a reading access condition of the target elementary file EF matches a specific access condition level. For example, the processor 120 determines whether the reading access condition of the target elementary file EF matches the ALW level or the PIN/PIN2 level. If the reading access condition of the target elementary file EF fails to match the ALW level or the PIN/PIN2 level (the determination result of operation S402 shows "NO") (e.g., the reading access condition of the target elementary file EF is the ADM level or the NEV level), an operation S404 is entered. In other words, the user is not allowed to read the target elementary file EF, so the processor 120 determinates that the reading process is unsuccessful. On the contrary, if the reading access condition of the target elementary file EF matches the ALW level or the PIN/PIN2 level (the determination result of operation S402 shows "YES"), an operation S406 is entered.

In operation S406, the processor 120 determines whether the reading process supports a short file identification (SFI) format. If the reading process fails to support the SFI format (the determination result of operation S406 shows "NO"), an operation S408 is entered. For example, if the reading process fails to support the SFI format, using a shorter identification number in a command to read the elementary file in the current directory is not allowed and a complete identification number is required so that the elementary file can be selected and read.

In operation S408, the processor 120 selects the target elementary file EF. For example, the processor 120 outputs a selection command to select the target elementary file EF in the SIM card 140. Then, an operation S410 is entered.

In operation S410, the processor 120 reads the target elementary file EF. For example, the processor 120 outputs a reading command to read the target elementary file EF from the SIM card 140.

In the operation S406, if the reading process supports the SFI format (the determination result of operation S406 shows "YES"), an operation S412 is entered. For example, if the reading process supports the SFI format, it can use the shorter identification number in the command to read the elementary file in the current directory.

In operation S412, the processor 120 determines whether the target elementary file EF supports the SFI format. If the target elementary file EF fails to support the SFI format (the determination result of operation S412 shows "NO"), the operations S408 and S410 are entered to output a selection command and a reading command to select and read the target elementary file EF. On the contrary, if the target elementary file EF supports the SFI format (the determination result of operation S412 shows "YES"), an operation S414 is entered.

In operation S414, the processor 120 determines whether the target elementary file EF in the current directory. If the target elementary file EF is not in the current directory (the determination result of operation S414 shows "NO"), an operation S416 is entered.

In operation S416, the processor 120 selects a parent directory of the target elementary file EF. For example, the processor 120 selects (e.g., directly be guided by a specific path) the dedicated files DF or the application dedicated file ADF corresponding to the target elementary file EF, as illustrated in FIG. 2. Then, an operation S418 is entered.

In operation S418, the processor 120 uses the SFI format to read the target elementary file EF. For example, the processor 120 outputs the reading command to use the SFI format to read the target elementary file EF from the SIM card 140.

It returns back to operation S414. If the processor 120 determines that the target elementary file EF is in the current directory (the determination result of operation S414 shows "YES"), an operation S418 is entered to use the SFI format to read the target elementary file EF from the SIM card 140.

As described above, the operations of reading the target elementary file EF includes to select the file (as operation S408) and to read the file (as operation S410). The transmission protocol of an application protocol data unit (APDU) of the SIM card 140 includes a transmission protocol of T=0 and a transmission protocol of T=1.

Figure 5:
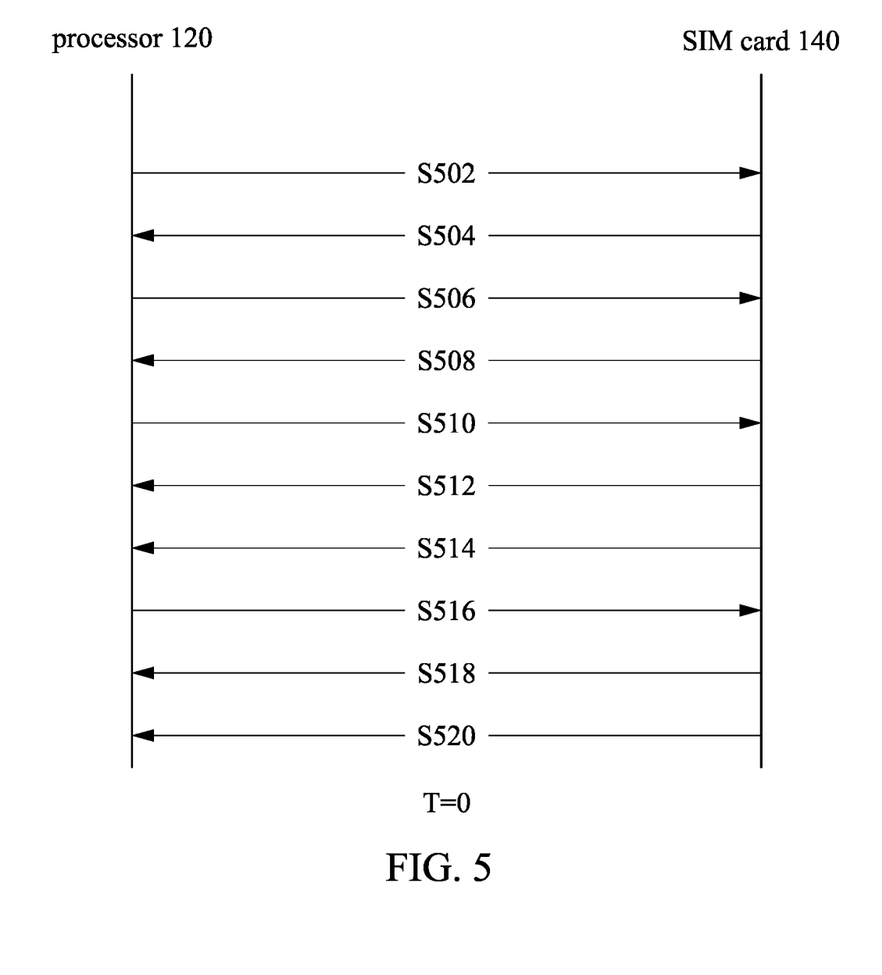
FIG. 5 is a schematic diagram illustrating a signal transmission process under a transmission protocol according to some embodiments of the present disclosure.

Reference is made to FIG. 5. FIG. 5 is a schematic diagram illustrating a signal transmission process under the transmission protocol T=0 according to some embodiments of the present disclosure.

At first, the processor 120 sends a SELECT command header to the SIM card 140 (operation S502). Then, the SIM card 140 sends a procedure byte to the processor 120 (operation S504). If the received procedure byte is equal to SELECT command INS, the processor 120 sends SELECT command data to the SIM card 140 (operation S506). Then, the processor 120 receives status words (operation S508). If the status words are not in form of 0x61XX (XX indicates a length), the process terminates. If the status words are in form of 0x61XX, the processor 120 sends a GET RESPONSE command header to the SIM card 140 (operation S510). Then, the SIM card 140 sends a procedure byte to the processor 120 (operation S512). If the received procedure byte is the GET RESPONSE command INS, the processor 120 continues to receive the target file, or the file control parameter of the target file and status words sent from the SIM card 140 (operation S514). Then, the processor 120 sends a READ BINARY command header or a READ RECORD command header to the SIM card 140 according to the structure type of the target file to read the target file (operation S516). Then, the SIM card 140 sends a procedure byte to the processor 120 (operation S518). If the received procedure byte is the READ BINARY command INS or READ RECORD command INS, the processor 120 continues to receive the file and status words sent by the SIM card 140 (operation S520) and then terminate the reading process.

Figure 6:
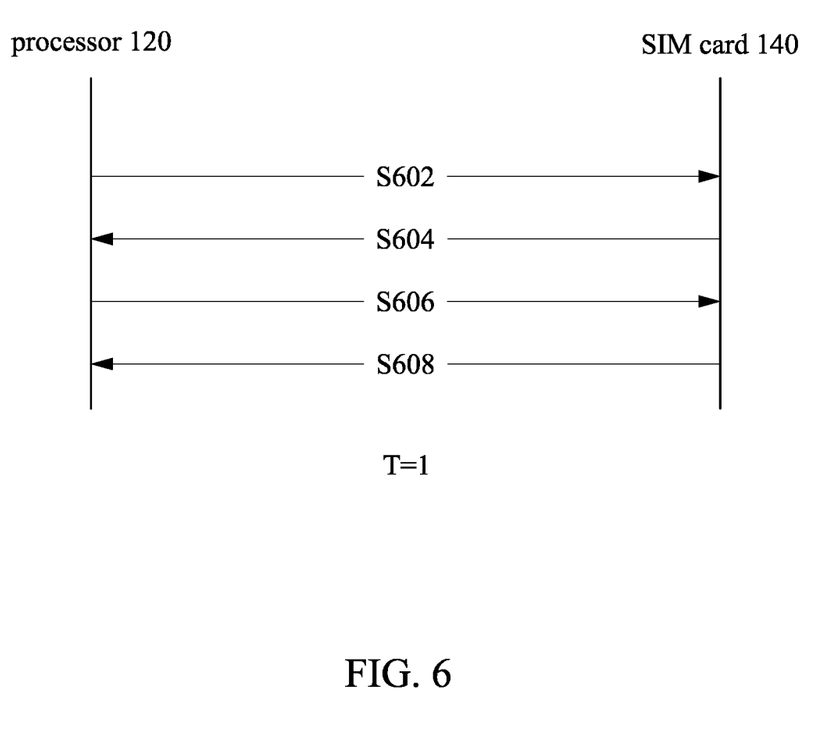
FIG. 6 is a schematic diagram illustrating a signal transmission process under a transmission protocol according to some embodiments of the present disclosure.

Reference is made to FIG. 6. FIG. 6 is a schematic diagram illustrating a signal transmission process under the transmission protocol T=1 according to some embodiments of the present disclosure.

At first, the processor 120 sends a SELECT command to the SIM card 140 (operation S602). The SELECT command includes a selection command header and selection command data. In other words, in FIG. 6, the selection command header and the selection command data are transmitted to the SIM card 140. Then, the SIM card 140 sends the target file, or the file control parameter of the target file and status words to the processor 120 (operation S604). If the received status words indicate that file selection is completed normally, the processor 120 sends a READ BINARY command header or a READ RECORD command header to the SIM card 140 according to the structure type of the target file to read the target file (operation S606). Then, the processor 120 continues to receive the file and status words sent by the SIM card 140 (operation S608) and then terminate the reading process.

In general, when selecting applications supported by the SIM card 140, it requires reading an $EF_{DIR}$ file (including applications and corresponding identification number (ID)). In addition, about 20 files are read in each boot initialization process. These files are, for example but not limited to, an $EF_{ECC}$ file associated with emergency call codes, an $EF_{LI}$ ($EF_{PL}$) file associated with languages, an $EF_{UST}$ file associated with a list of applications supported by a USIM card, an $E_{FEST}$ file associated with a list of enabled applications, an $EF_{AD}$ file associated with operation modes and a size of a mobile network code, an $EF_{IMSI}$ file associated with an identification number of a SIM card, an $EF_{ACC}$ file associated with an access control level, an $EF_{FPLMN}$ file associated with a list of prohibited public land mobile networks. To read a file from the SIM card 140, the operations shown in FIG. 5 or FIG. 6 are performed according to the transmission protocol. In other words, a high volume signal transmission between the processor 120 and the SIM card 140 is established during each boot initialization or normal operations. This could greatly affect the startup time and efficiency of the communication device 100.

However, as described above, in the present disclosure, the processor 120 merely reads the target elementary file EF from the SIM card 140 once and stores the target elementary file EF into the non-volatile memory 160. Thus, next time the processor 120 tries to read the file, the processor 120 can read the file directly from the non-volatile memory 160. Since reading data from the non-volatile memory 160 is faster, the present disclosure can reduce the startup time of the communication device 100 and improve the efficiency of the communication device 100.

Based on the descriptions above, in the present disclosure, if the file is not stored in the non-volatile memory, the processor performs the reading process to read the file from the SIM card and store the file into the non-volatile memory. Thus, the processor is able to read the file directly from the non-volatile memory next time so the efficiency of the communication device is improved.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A file reading method, comprising:
   determining, by a processor, whether a file in a Subscriber Identity Module (SIM) card is stored in a non-volatile memory;
   performing, by the processor, a reading process to read the file from the SIM card if the file is not stored in the non-volatile memory; and
   storing, by the processor, the file into the non-volatile memory,
   wherein performing the reading process to read the file from the SIM card comprises:
      determining, by the processor, whether a reading access condition of the file matches a specific access condition level;
      determining, by the processor, whether the reading process supports a short file identification (SFI) format if the reading access condition of the file matches the specific access condition level;
      outputting, by the processor, a first selection command to select the file in the SIM card if the reading process fails to support the SFI format; and
      outputting, by the processor, a first reading command to read the file from the SIM card.

2. The file reading method of claim 1, further comprising:
   determining, by the processor, whether an identification number in the non-volatile memory is identical to an identification number of the SIM card if the file is stored in the non-volatile memory; and
   reading out, by the processor, the file from the non-volatile memory if the identification number in the non-volatile memory is identical to the identification number of the SIM card.

3. The file reading method of claim 1, further comprising:
   updating, by the processor, the file in the non-volatile memory if the file in the SIM card is updated.

4. The file reading method of claim 1, further comprising:
   determining, by the processor, whether the file supports the SFI format if the reading process supports the SFI format;
   outputting, by the processor, the first selection command to select the file from the SIM card if the file fails to support the SFI format; and
   outputting, by the processor, the first reading command to read the file from the SIM card.

5. The file reading method of claim 4, further comprising:
   determining, by the processor, whether the file is in a current directory if the file supports the SFI format; and
   outputting, by the processor, a second reading command to use the SFI format to read the file from the SIM card if the file is in the current directory.

6. The file reading method of claim 5, further comprising:
   outputting, by the processor, a second selection command to select a parent directory of the file if the file is not in the current directory; and
   outputting, by the processor, the second reading command to use the SFI format to read the file from the SIM card.

7. The file reading method of claim 1, further comprising:
   determining, by the processor, that the reading process is unsuccessful if the reading access condition of the file fails to match the specific access condition level.

8. The file reading method of claim 1, wherein the SIM card is a Universal Subscriber Identity Module (USIM) card.

9. A non-transitory computer readable storage medium comprising at least one program code, a processor configured to execute the at least one program code to perform following operations:
  determining whether a file in a Subscriber Identity Module (SIM) card is stored in a non-volatile memory;
  performing a reading process to read the file from the SIM card if the file is not stored in the non-volatile memory; and
  storing the file into the non-volatile memory,
  wherein performing the reading process to read the file from the SIM card comprises:
    determining whether a reading access condition of the file matches a specific access condition level;
    determining whether the reading process supports a short file identification (SFI) format if the reading access condition of the file matches the specific access condition level;
    outputting a first selection command to select the file in the SIM card if the reading process fails to support the SFI format and
    outputting a first reading command to read the file from the SIM card.

10. The non-transitory computer readable storage medium of claim 9, further comprising:
  determining whether an identification number in the non-volatile memory is identical to an identification number of the SIM card if the file is stored in the non-volatile memory; and
  reading out the file from the non-volatile memory if the identification number in the non-volatile memory is identical to the identification number of the SIM card.

11. The non-transitory computer readable storage medium of claim 9, further comprising:
  updating the file in the non-volatile memory if the file in the SIM card is updated.

12. The non-transitory computer readable storage medium of claim 9, further comprising:
  determining whether the file supports the SFI format if the reading process supports the SFI format;
  outputting the first selection command to select the file from the SIM card if the file fails to support the SFI format; and
  outputting the first reading command to read the file from the SIM card.

13. The non-transitory computer readable storage medium of claim 12, further comprising:
  determining whether the file is in a current directory if the file supports the SFI format; and
  outputting a second reading command to use the SFI format to read the file from the SIM card if the file is in the current directory.

14. The non-transitory computer readable storage medium of claim 13, further comprising:
  outputting a second selection command to select a parent directory of the file if the file is not in the current directory; and
  outputting the second reading command to use the SFI format to read the file from the SIM card.

15. The non-transitory computer readable storage medium of claim 9, further comprising:
  determining that the reading process is unsuccessful if the reading access condition of the file fails to match the specific access condition level.

16. The non-transitory computer readable storage medium of claim 9, wherein the SIM card is a Universal Subscriber Identity Module (USIM) card.

17. A communication device, comprising:
  a non-volatile memory;
  a Subscriber Identity Module (SIM) card configured to store a file; and
  a processor coupled to the non-volatile memory and the SIM card, wherein the processor is configured to determine whether the file is stored in the non-volatile memory, wherein the processor performs a reading process to read the file from the SIM card if the file is not stored in the non-volatile memory, and stores the file into the non-volatile memory,
  wherein the processor is further configured to determine whether a reading access condition of the file matches a specific access condition level, determine whether the reading process supports a short file identification (SFI) format if the reading access condition of the file matches the specific access condition level, output a first selection command to select the file in the SIM card if the reading process fails to support the SFI format, and output a first reading command to read the file from the SIM card.

18. The communication device of claim 17, wherein the processor is further configured to determine whether an identification number in the non-volatile memory is identical to an identification number of the SIM card, wherein the processor read the file from the non-volatile memory if the identification number in the non-volatile memory is identical to the identification number of the SIM card.

* * * * *